(12) United States Patent
Douglass

(10) Patent No.: US 12,347,635 B2
(45) Date of Patent: Jul. 1, 2025

(54) HIGH VOLTAGE DIRECT CURRENT CIRCUIT PROTECTION SYSTEM AND METHOD

(71) Applicant: EATON INTELLIGENT POWER LIMITED, Dublin (IE)

(72) Inventor: Robert Stephen Douglass, Wildwood, MO (US)

(73) Assignee: Eaton Intelligent Power Limited, Dublin (IE)

( * ) Notice: Subject to any disclaimer, the term of this patent is extended or adjusted under 35 U.S.C. 154(b) by 238 days.

(21) Appl. No.: 17/524,170

(22) Filed: Nov. 11, 2021

(65) Prior Publication Data
US 2023/0141970 A1 May 11, 2023

(51) Int. Cl.
| | |
|---|---|
| *H01H 39/00* | (2006.01) |
| *B60L 3/04* | (2006.01) |
| *H02H 3/08* | (2006.01) |
| *H02H 7/26* | (2006.01) |

(52) U.S. Cl.
CPC .............. *H01H 39/006* (2013.01); *B60L 3/04* (2013.01); *H02H 3/08* (2013.01); *H02H 7/268* (2013.01); *H01H 2039/008* (2013.01)

(58) Field of Classification Search
CPC .................. H01H 39/00; H01H 39/006; H01H 2039/008; B60L 3/04; H02H 3/08; H02H 7/268
See application file for complete search history.

(56) References Cited

U.S. PATENT DOCUMENTS

| | | |
|---|---|---|
| 2,931,874 A | 10/1953 | Leaman |
| 3,793,501 A | 2/1974 | Stonestrom |
| 4,417,519 A | 11/1983 | Lutz |

(Continued)

FOREIGN PATENT DOCUMENTS

| | | |
|---|---|---|
| DE | 102012212509 A1 | 1/2014 |
| FR | 3089053 A1 | 5/2020 |

(Continued)

OTHER PUBLICATIONS

Pyrotechnical Safety Switches; Autoliv; www.autoliv.com/pss; retrieved Nov. 11, 2021; 3 pages.

(Continued)

*Primary Examiner* — Jacob R Crum
(74) *Attorney, Agent, or Firm* — Baker Botts L.L.P.

(57) ABSTRACT

A high voltage, direct current circuit protection system includes a number n of weakened circuit conductors connected in series to one another and being fabricated in a manner to avoid metal fatigue in response to cyclic current loads. The system also includes a corresponding number n of cutting elements operable to sever the respective weakened circuit conductors, at least one energy storage element acting upon one of the cutting elements, a control element causing a release of stored energy in the at least one energy storage element and causing a displacement of at least one of the cutting elements to sever the respective weakened circuit conductor, and a corresponding number n of arc chambers arranged proximate each respective one of the weakened circuit conductors, wherein n is an integer greater than 1 and wherein no circuit protector coordination with the weakened circuit protectors is required.

15 Claims, 6 Drawing Sheets

(56) References Cited

U.S. PATENT DOCUMENTS

| | | | | |
|---|---|---|---|---|
| 5,280,261 | A * | 1/1994 | Mollet | H01H 85/10 |
| | | | | 337/279 |
| 5,877,563 | A * | 3/1999 | Krappel | H01H 39/006 |
| | | | | 200/61.08 |
| 6,556,119 | B1 * | 4/2003 | Lell | H01H 37/323 |
| | | | | 337/182 |
| 7,123,124 | B2 | 10/2006 | Caruso et al. | |
| 9,221,343 | B2 | 10/2015 | Tokarz et al. | |
| 9,789,782 | B2 | 10/2017 | Holgers et al. | |
| 10,312,040 | B2 | 6/2019 | von zur Muehlen et al. | |
| 10,361,048 | B2 | 7/2019 | von zur Muehlen et al. | |
| 2013/0126326 | A1 * | 5/2013 | Borg | H01H 15/06 |
| | | | | 200/547 |
| 2016/0336131 | A1 * | 11/2016 | Fellmer | H01H 33/182 |
| 2017/0229266 | A1 * | 8/2017 | Cortes | H01H 9/36 |
| 2018/0294130 | A1 | 10/2018 | Doerr | |
| 2020/0066465 | A1 * | 2/2020 | Moszynski | H01H 9/32 |
| 2020/0287372 | A1 | 9/2020 | Lell | |
| 2022/0013308 | A1 * | 1/2022 | Fleureau | H01H 9/54 |

FOREIGN PATENT DOCUMENTS

| | | |
|---|---|---|
| WO | WO 2020099474 A1 | 5/2020 |
| WO | WO 2021037896 A1 | 3/2021 |

OTHER PUBLICATIONS

Automotive Products; Special Devices, Inc.; www.specialdevices.com/automotive.htm; retrieved Nov. 11, 2021; 2 pages.
International Search Report and Written Opinion for International Application No. PCT/EP2022/025498, 18 pages, Feb. 17, 2023.

* cited by examiner

HIGH VOLTAGE DIRECT CURRENT CIRCUIT PROTECTION SYSTEM AND METHOD

BACKGROUND OF THE INVENTION

The field of the invention relates generally to electrical power system circuit protection systems, and more specifically to high voltage, direct current circuit protection systems and methods including active circuit protector devices with propelled cutting elements to interrupt weakened circuit conductors.

Overcurrent protection devices are in prolific use to protect components and circuits in electrical power systems from potentially damaging overcurrent conditions. Overcurrent circuit protectors may be passive devices such as overcurrent protection fuses including fuse elements that are heated and melted by current in order to interrupt the current flowing through the fuse, or active devices that interrupt a circuit conductor with assistance of stored energy in the device.

Active circuit protection devices such as pyrotechnic disconnect devices are known that include line and load side connection terminals and a pyrotechnic disconnect feature that releases stored energy to disconnect the line and load side terminals from one another at a location inside the device. The released stored energy in the device propels a cutting tool that, in turn, mechanically severs a weakened conductor portion interconnected between the line and load side connection terminals of the device. Once activated, such devices electrically isolate load-side circuitry from line-side circuitry through the pyrotechnic circuit protection device when predetermined fault conditions occur in the line-side circuitry and prevent possible damage to load-side circuitry that the fault condition may otherwise present.

As customarily implemented, pyrotechnic disconnect devices are advantageous for their quick and reliable operation regardless of the electrical energy (voltage and current) in the circuit completed through the device when fault conditions are identified. This is because the energy needed to open the device comes from a chemically stored source in the pyrotechnic unit rather than the energy of the circuit fault (as in a fusible circuit protector) or from stored mechanical energy (as in conventional circuit breaker devices). Pyrotechnic disconnect devices are known that work well in lower voltage power systems, but are disadvantaged in some aspects for use in higher voltage power systems, including but not limited to certain types of electrical vehicle power systems imposing extreme demands on circuit protectors. Existing circuit protector solutions therefore have yet to completely meet the needs of the marketplace. Improvements are accordingly desired.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

Figures 1, 2:
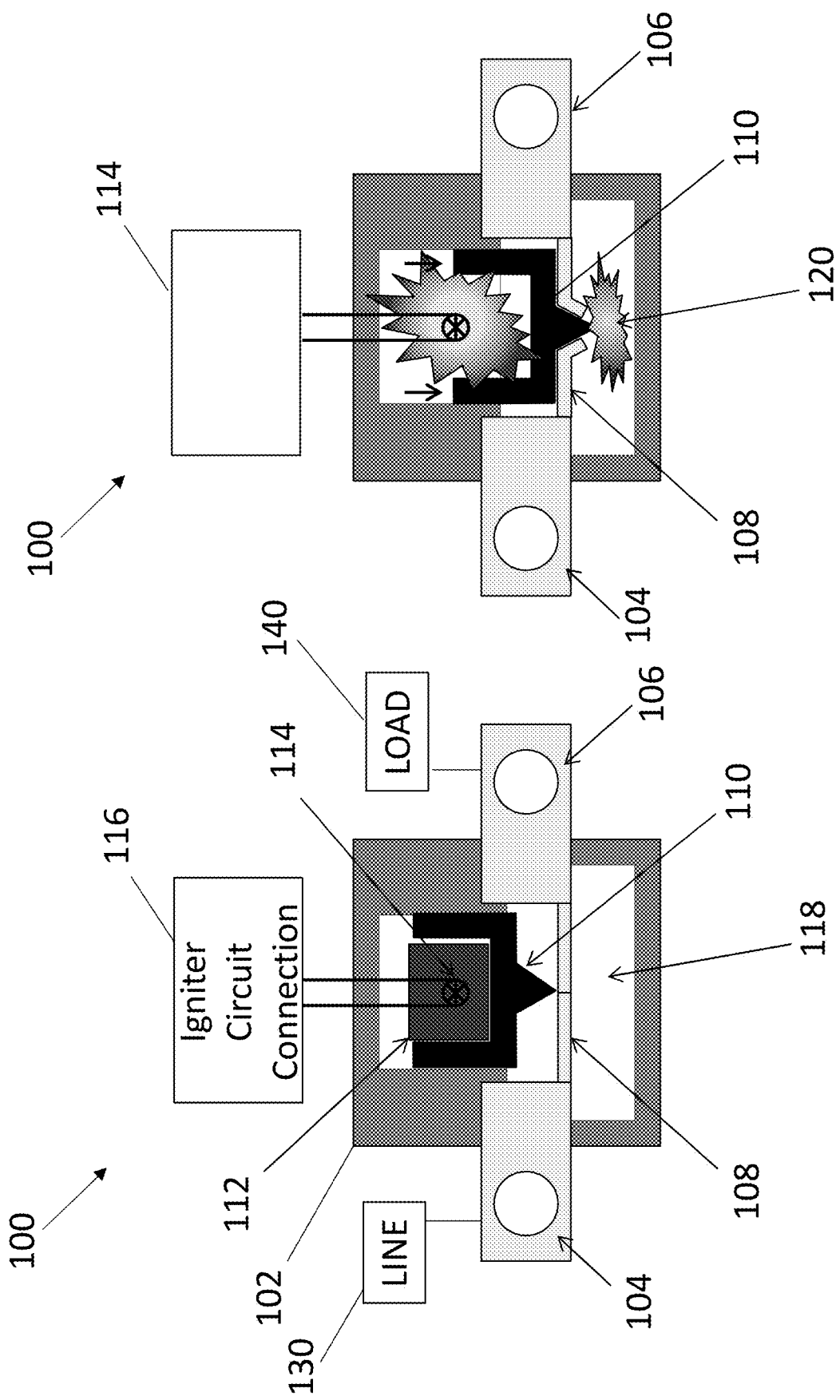
FIG. 1 illustrates an exemplary low voltage active circuit protector device in a normal operating condition.
FIG. 2 illustrates the low voltage active circuit protector device after actuation thereof to sever the circuit conductor in the device.

Exemplary embodiments of high voltage circuit protection systems including low voltage active circuit protector devices are described below that advantageously overcome difficult problems in certain types of electrical power systems involving extreme cyclic current loading, such as but not necessarily limited to certain types of electrically powered vehicles (referred to herein as EVs) presenting particular high voltage and current issues described further below. Method aspects will be in part apparent and in part explicitly discussed in the following description.

Electrical power systems for EVs operate at substantially higher voltages than power systems of conventional vehicles having internal combustion engines. The higher operating voltages enable the batteries of the EV to store more energy from a power source and provide more energy to an electric motor of the EV. At least some known EV power systems operate at voltages as high as 450 VDC, yielding very demanding operating conditions for circuit protector components needed to protect key components and load circuits in the power system.

In particular, the increased operational voltage of modern EVs has imposed a critical need to safely and reliably protect the batteries from overcurrent conditions in the power distribution system. Primary vehicle drive batteries are capable today of delivering short circuit currents in the order of thousands if not tens of thousands of amperes. Additionally, to keep the battery weight and size small the voltage potential of EV batteries is increasing to 800 VDC and possibly even higher in the continuing innovation of EV power systems, presenting additional challenges in interrupting high overcurrent conditions in substantially higher voltage conditions.

Modern electric power fuses are prolifically used in many high voltage electrical applications and especially in the commercial and industrial application space today. Such modern power fuses are capable of interrupting comparable currents at high voltages to those present in EV power system via a passive melting of the fuse elements in response to predetermined overcurrent conditions. However, in the all battery electric vehicle (BEV) space there has developed a special need for circuit protection performance that practically cannot be delivered by the classic electric power fuse or even a conventional circuit breaker.

With respect to electrical fuses, EVs are subject to seemingly random current profiles including rapidly changing positive and negative current cycles of significant magnitude (e.g., hundreds of amps). Such cyclic loading of the fuse, in turn, imposes a cyclic thermal-mechanical strain on the fuse element, undesirably causing the fuse to open prematurely before an end of its desired or otherwise expected service life. This cyclic problem is also known as fuse fatigue. While innovative power fuses have been introduced recently to address fuse fatigue problems in EV power systems with some success, they are not well matched for certain types of high performance EVs wherein more extreme current loads are needed to support desired features.

For example, implementation of high-power vehicle traction performance features in certain types of EVs imposes a relatively extreme cyclic thermal-mechanical strain on the metal fuse elements than more typical EV power systems that do not have such high performance capabilities. This is especially so in high acceleration modes of a high performance EV, wherein the associated cyclic thermal-mechanical strains imposed easily exceeds the capability of power fuses specifically designed to withstand cyclic loading and fuse fatigue in EV applications, again leading to premature opening of the fuses well before an end of their desired or otherwise expected service life. Such an extreme fuse fatigue problem in a high performance EV is further challenged when the EV battery of the high performance vehicle has a limited amount of energy in the first instance, such that the fuse fatigue problem cannot be solved by simply increasing the power fuse ampacity without compromising the desired circuit protection of the EV power system.

In view of the above extreme cyclic current metal fatigue issues in fuses that lack a clear solution in high performance EV power systems of the type described above, circuit protection fuses have become generally disfavored as primary circuit protectors in certain types of EVs. Practically speaking, the only way to eliminate the fuse fatigue problem is to eliminate the power fuse. Consequently, high performance EV manufacturers are turning to other types of circuit protectors for alternative solutions.

Circuit breaker devices can be undesirably slow to respond to certain types of overcurrent conditions, specifically with respect to short circuit conditions and therefore are not good candidates for EV power systems. Generally speaking, a power fuse will operate to interrupt short circuit conditions almost instantaneously while it takes some amount of time for the circuit breaker to effect a physical change in state of the breaker contacts. As such, a power fuse will generally open before a circuit breaker will open when exposed to same short circuit, and because of this in many industrial applications mechanical circuit breakers and power fuses are often connected in selectively coordinated pairs to improve the short circuit response of the breaker and fuse combination beyond the capability of the circuit breaker itself. Because of the fuse fatigue problem described above, however, the use of a fuse and circuit breaker is not advisable in an EV power system.

FIGS. 1 and 2 illustrate an active circuit protector device 100 that is more tolerant of cyclic current loads than power fuses and therefore does not suffer from metal fatigue and premature failure as power fuses in a higher performance EV power system, while still operating in a desired timeframe to interrupt detected overcurrent conditions. For the purposes of the present description, the device 100 is "active" by virtue of a stored energy source independent of the energy presented in the electrical circuit (voltage and current) completed through the device 100. Such an "active" device is specifically contrasted with a "passive" device such as a power fuse that is operated solely with respect to the electrical energy of the connected electrical circuit and therefore without a stored energy source to assist in the operation of the device to interrupt an overcurrent condition. Specifically, the stored energy of the "active" device actuates a movable mechanical element to permanently interrupt the circuit through the device.

The active circuit protector device 100 in the example of FIGS. 1 and 2 includes a generally rectangular or box-like housing 102 formed and fabricated from an electrically nonconductive material such as heavy duty plastic or another suitable material known in the art. The housing 102 may be formed in a single piece or as multiple pieces that are assembled to one another. Various alternative shapes, contours, proportions and configurations of housings may be utilized in lieu of the box-like housing shown.

Line and load-side terminals 104, 106 project from opposing sides of the housing 102 for establishing electrical connection to respective line-side circuitry 130 and load-side circuitry 132 in a power system. The line-side circuitry or power supply circuit may include a vehicle battery for example, while the load-side circuitry represents the electrical loads in the vehicle being fed power through the battery. The line-side and load-side terminals 104, 106 in the illustrated example are terminal blades including apertures formed therein for bolt-on connection to conductors in a vehicle power system. Various other types and configurations of terminal blades are known and may be used with the device 100 in alternative embodiments, however. In some cases, the terminals 104, 106 may be connected to terminals of a circuit protector accessory such as holder that is provided with connector terminals that are, in turn, connected to a conductor bus structure of a vehicle power system.

Interconnecting the line and load-side terminals 104, 106 inside the housing 102 is a weakened circuit conductor 108 that is fabricated from a conductive metal or metal alloy in contemplated embodiments. The weakened circuit conductor may be fabricated integrally with the line and load-side terminals in a one-piece construction or may be separately provided and assembled to the line and load-side terminals 104, 106 in contemplated embodiments. The weakened circuit conductor 108 has a reduced cross-sectional area relative to the line and load-side terminals 104, 106 and therefore has a reduced structural strength and rigidity. The weakened circuit conductor 108 can be formed in various shapes and geometry including but not limited to that shown in FIGS. 1 and 2. Preferably, however, the weakened circuit conductor 108 avoids stamped openings and the like that may contribute to undesirable metal fatigue due to cyclic current loading. Stamped openings to define weak spots in fuse elements of power fuses are understood to be highly susceptible to metal fatigue. As such, the weakened circuit conductor 108 should be designed with metal fatigue considerations in mind. To the extent that openings in the weakened circuit conductor may be desired, however, they are not necessarily prohibited so long as they are formed and fabricated in a manner that does not lead to metal fatigue in the operation of the weakened circuit conductor 108 in the operation of a vehicle such as an EV power system imposing cyclic current loads.

As shown in FIGS. 1 and 2, the weakened circuit conductor 108 is simply shaped as an elongated metal strip element having a vastly reduced thickness (measured in a plane parallel to the plane of the page on which FIGS. 1 and 2 appear) than the terminals 104, 106 to provide the reduced cross-sectional area and structural strength of the weakened circuit conductor 108. In further and/or alternative embodiments, the weakened circuit conductor 108 may likewise be reduced in another dimension (e.g., the width dimension measured perpendicularly to the thickness dimension and normal to the plane of the page including FIGS. 1 and 2) as desired. Curved side edges and contours of the weakened circuit conductor 106 are likewise possible to vary the cross sectional area of the weakened circuit conductor 108 along an axial length thereof. As such, the reduced cross sectional area of the weakened circuit conductor 108 may be constant along its axial length or may be variable along the axial length. Numerous variations are possible in this regard.

The device 100 further includes a cutting element 110 such as a breaking knife including a cutting blade at a distal end thereof. The cutting element 110 is shown with a particular shape and geometry in FIGS. 1 and 2 although others are possible. The cutting element 110 is formed and fabricated from a non-conductive material such as plastic or ceramic in contemplated embodiments. The cutting element 110 is located proximate the weakened circuit conductor 108 inside the housing 102 with the cutting blade oriented to face the weakened circuit conductor 108.

A stored energy source 112 is located in the device 100 proximate the cutting element 110. The stored energy source 112 may be an explosive energetic chemical element in some embodiments, and the device 100 may therefore be referred to as a pyrotechnic disconnect device. It is recognized, however, that stored mechanical energy, stored electrical energy, and stored chemical energy may alternatively be provided in the device 100 in lieu of an explosive, pyrotechnic energy store in another embodiment.

In the illustrated example of a pyrotechnic device, an igniter element 114 is provided that is responsive to a control circuit 116. When the control circuit 116 determines that a problematic overcurrent condition exists, it provides a trigger signal causing the igniter 114 to operate and, in turn, ignite the explosive pyrotechnic energy store in the energy source 112. Ignition of the energy source 112 releases the stored energy in an explosive manner that displaces the adjacent cutting element 110 inside the device 100. Specifically, the cutting element 110 is propelled by explosive release of stored energy toward the weakened circuit conductor 108 with sufficient force such that when the cutting element 110 impacts the weakened circuit conductor 108, the cutting element 110 cuts or penetrates completely through the weakened circuit conductor 108 in order to mechanically sever the weakened circuit conductor 108 as shown in FIG. 2 to interrupt the current path through the weakened circuit conductor 108 in the device 100.

In a non-pryotechnic device, the igniter 114 may be omitted in favor of another means of releasing the stored energy (e.g., mechanical or electrical energy) that likewise causes the cutting element 110 to be displaced inside the housing 102, which may be coordinated by and through a control circuit or another detecting element as desired. Regardless of the type of energy store and specifically how the energy is released, the important result is that the cutting element 110 severs the weakened circuit conductor 108 to permanently open the circuit path through the device 100.

As the weakened circuit conductor 108 is initially severed electrical arcing 120 (FIG. 2) takes place in an arc chamber 118 (FIG. 1) formed in the housing 102 of the device 100. Air in the chamber 118, or perhaps an arc extinguishing media (e.g., sand) filling the chamber 118, cools the arc and dissipates arc energy until the arc can no longer conduct between the severed sections of the conductor. When arcing ceases in the chamber 118, the severed weakened circuit conductor 108 can no longer conduct current and the severed conductor therefore electrically isolates the line and load-side terminals 104, 106 through the device 100 and protects load-side circuitry 140 from damaging overcurrent conditions.

The device 100 may be manufactured at relatively low cost with reliable operation that is not subject to metal fatigue issues. Notably, however, the device 100 is designed to sever, cut or break the circuit conductor at a single point (i.e., one and only one point) corresponding to where the cutting blade of the cutting element 110 hits the weakened circuit conductor 108. This means that the operating potential of voltage must be relatively low (e.g., less than about 150 VDC in one example) in order for the device 100 to survive the ensuing arc energy in operation. As such, the device 100 is referred to herein as a low voltage circuit protector device. Accordingly, the device 100 would clearly work well as a stand-alone circuit protector in power systems operating with a potential of 150 VDC or lower, such as in a low voltage power system of a conventional vehicle with an internal combustion engine.

The low voltage nature of the device 100 means that other measures are needed use the device 100 as a circuit protector in an EV power system operating at a voltage well exceeding 150 VDC. Without additional measures being taken, the severity of arcing in a high voltage, direct current EV power system would result in catastrophic failure of the device 100. A device similar in operation to the low voltage device 100 but designed for higher voltage operation could perhaps be custom designed for a 450 VDC power system, but at an undesirable cost.

Figure 3:
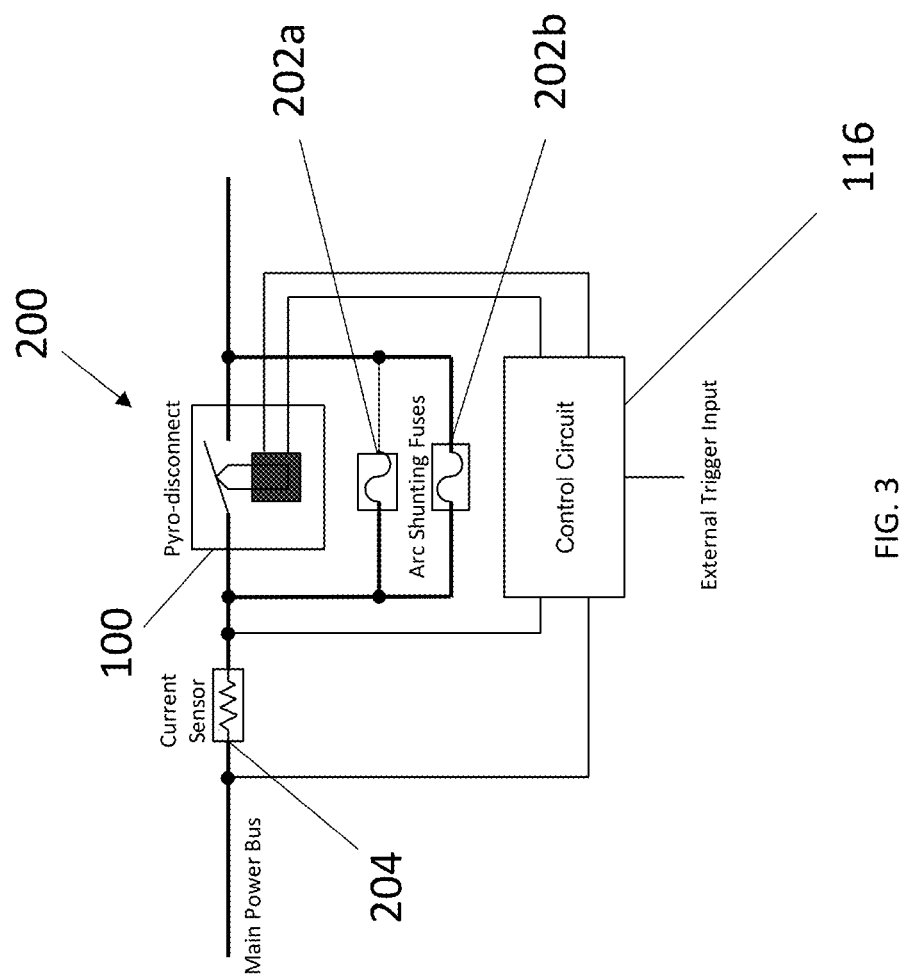
FIG. 3 is a first exemplary circuit schematic including the low voltage active circuit protector device element shown in FIGS. 1 and 2 with parallel connected arc shunting fuses for operation in a higher voltage power system.

As shown in the schematic of FIG. 3, the low voltage, single break point device 100 can be safely used in a system 200 to disconnect an EV battery (or batteries) that operate with voltage potential higher than 150 VDC (e.g., 450 VDC) when paired with arc shunting fuses 202a, 202b connected in parallel with the device 100. The control circuit 116 in the system 200 is responsive to a current sensor 204 to detect an overcurrent condition on the main power bus of the EV, and in turn the control circuit 116 causes the device 100 to operate and the cutting element 110 (FIGS. 1 and 2) to sever the weakened circuit conductor 108 as described above.

When the weakened circuit protector 108 is cut in the operation of the device 100 at high voltage potential (e.g., 450 VDC) the current is shunted into the parallel connected fuses 202a, 202b. The fuse elements in the fuses 202a, 202b passively melt in response to the shunted current and advantageously absorb and contain arc energy in the fuses 202a, 202b to reduce, if not eliminate, excess arcing energy that would otherwise occur entirely inside the device 100 in a destructive manner, while the fuses 202a, 202b otherwise remain isolated from the cyclic current loads of the EV during normal operation of the main power bus.

The system 200 including one active circuit protector device 100 and multiple passive circuit protection fuses 202a, 202b may operate satisfactorily in extreme current loads of a high performance EV with a battery voltage potential of 450 VDC, but the design of this parallel fuse system must be accurately coordinated for safe and reliable operation thereof. In particular, if the ampacity of the fuses 202a, 202b is sized too large the pyrotechnic disconnect could still arc with catastrophic results. Of course, errors in the coordination of the fuses 202a, 202b could occur in the design phase of the system 200, in the initial assembly of the EV, or in the maintenance of the EV when fuses are replaced. Of course, any potential coordination errors would preferably be avoided.

Additionally, when the system 200 operates, three components (one device 100 and both fuses 202a, 202b) are permanently opened and must be replaced in order to restore full operation of the EV power system. This means that devices 100 and properly coordinated fuses 202 must be stocked in inventory to service the EV with minimal delay. Different types of EVs including different fuses in different coordination presents additional opportunity for confusion and mistake that would be desirably avoided.

Figure 4:
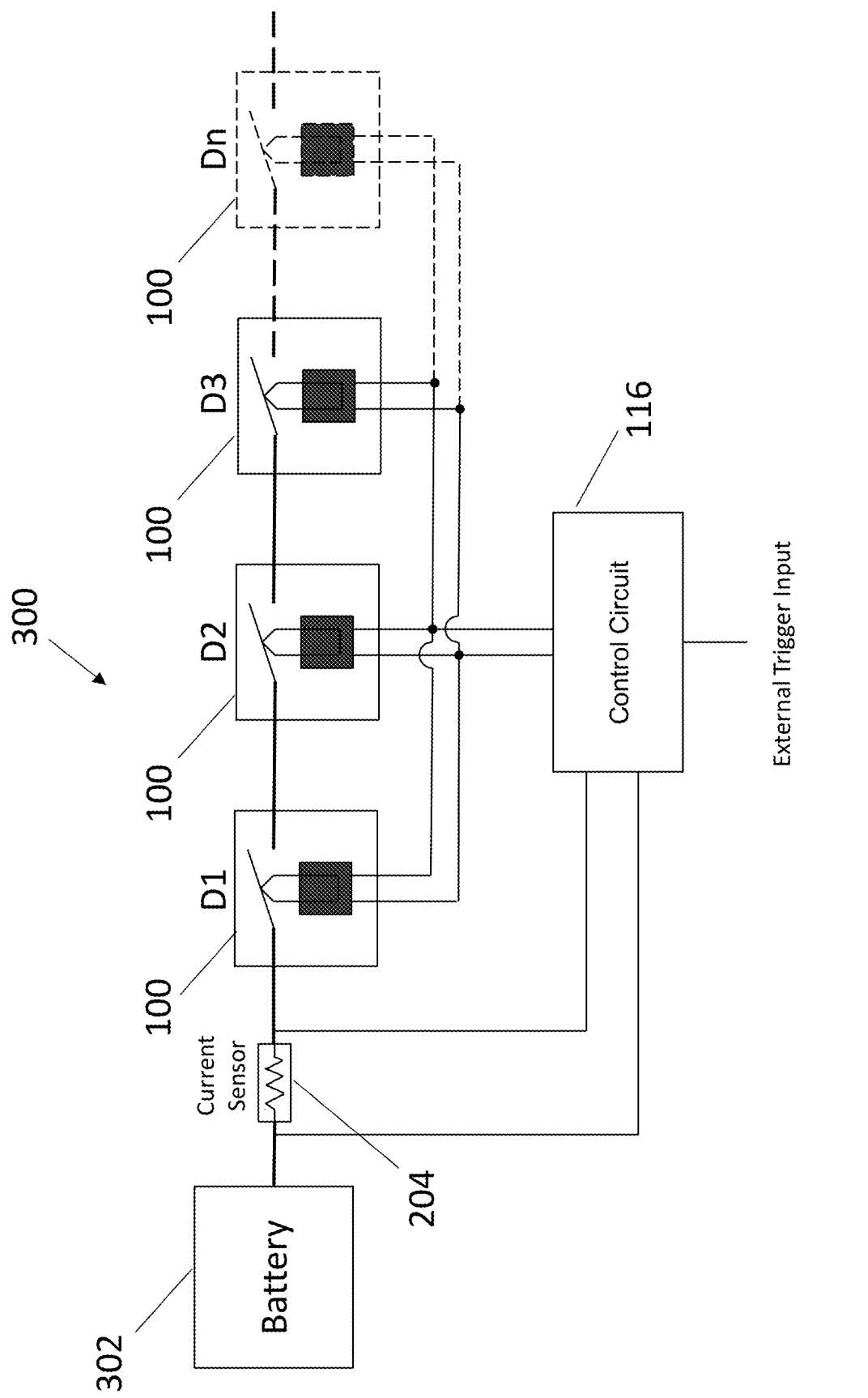
FIG. 4 is a second exemplary circuit schematic including an arrangement of low voltage active circuit protector devices shown in FIGS. 1 and 2 for higher voltage operation.

FIG. 4 schematically illustrates a circuit protection system 300 including a plurality of devices 100 connected in series to one another, and without any other circuit protector (e.g. the fuses 202a, 202b in the system 300 of FIG. 3) to be coordinated with the devices 100. The system 300 is scalable for different degrees of high voltage battery potential to include any number n of connected devices 100 to safely use the devices 100 in a higher voltage power system, where n is an integer greater than one.

Following the examples above, if each device 100 is safely operable at voltage potentials of 150 VDC or less, n may be selected to be 3, and three devices 100 (indicated in FIG. 4 as D1, D2 and D3) connected in series could operate at voltages of 450V or less (the sum of the voltage potential of each device because the voltage potential is divided or shared by each of the devices present).

To expand the voltage potential capability of the system 200 further, n could be selected to be 4, and therefore the nth device (i.e., a fourth device) would also be presented and connected in series to devices D1, D2 and D3, with the fourth device adding an incremental voltage potential of 150 VDC for a total capacity of 600 VDC. Systems having voltage potential capacity for 800V devices and higher are therefore easily realized via addition of devices to reach the desired voltage potential capacity for the EV power system being protected. Devices 100 could therefore be added or subtracted in a modular form to meet the needs of different EV power systems operating at different levels of high voltage, but while using a single type of device 100 to be stocked and inventoried and without any possible errors in the selection of devices 100.

Figure 5:
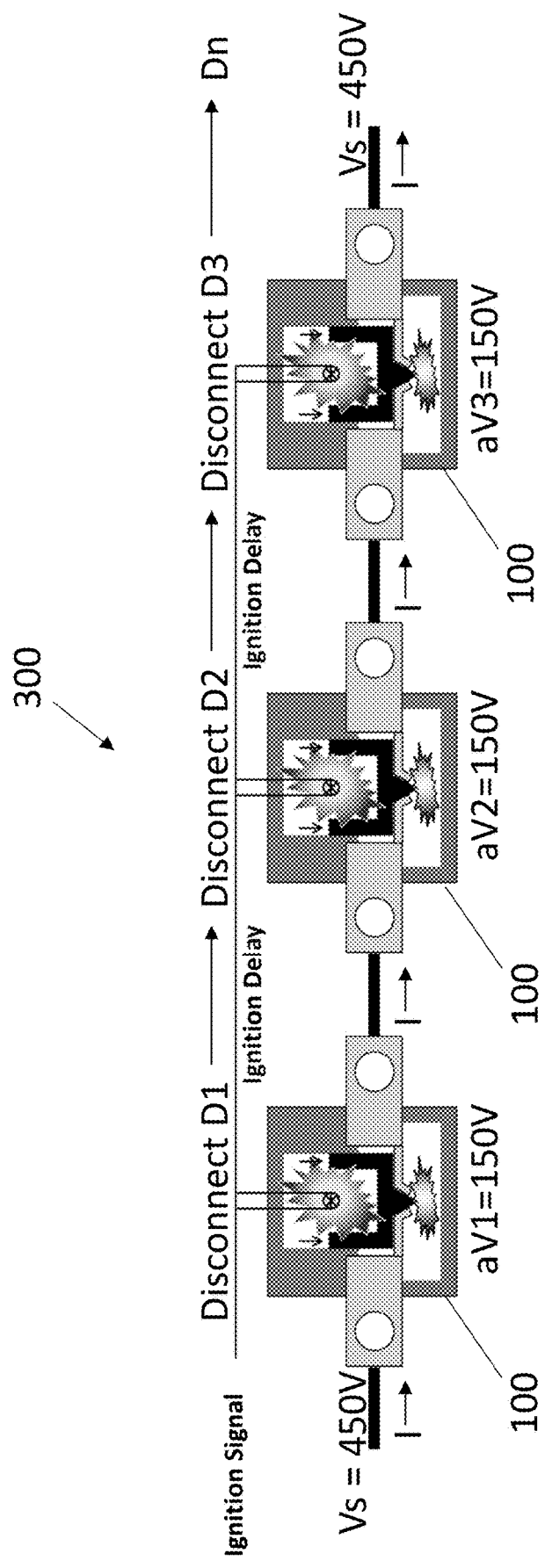
FIG. 5 illustrates an actuation of the low voltage active circuit protector devices in the arrangement shown in FIG. 4.

In the system 300, the weakened circuit conductors 108 in the devices 100 are connected to one another in series while the igniters 114 for each device 100 are connected in parallel. A single control circuit 116 is responsive to the current sensor 204 to issue trigger commands to all of the devices D1 through Dn to interrupt to the high voltage current path established through the devices D1 through Dn. The devices 100 corresponding to D1 through Dn may be arranged side-by-side as shown in FIG. 5 with the line and load side terminals 104, 106 of each device D1 through Dn aligned on a common centerline corresponding to the axial length of the assembly and with the terminals 104, 106 in each device D1 through Dn being generally coplanar. The weakened circuit conductors 108 in each device D1 through Dn is likewise arranged on a common axial centerline and the weakened circuit conductors 108 are generally coplanar. The geometric arrangement of devices D1 through Dn shown in FIG. 5 is exemplary only, however, and alternative arrangements are possible wherein the line and load-side terminals 104 and 106 and weakened circuit conductors 108 are not linearly aligned as shown and described above. The devices 100 are independently operable from one another in the system 300 to sever the respective weakened circuit conductors 108 in each device 100 with the cutting elements 110 provided.

As further illustrated in FIG. 5 where n is 3, in the example of a 450 VDC battery 302, each device D1, D2 and D3 carries an equal portion of the battery voltage, and as such, D1, D2 and D3 each respectively operate with voltage potential of about 150 VDC. Accordingly, the combination of devices D1, D2 and D3 can safely interrupt the battery current while accommodating the arc energy produced in each respective device. The trigger signals for each respective device D1, D2 and D3 may be issued from the control circuit 116 simultaneously or trigger signals may issue with a slight delay for the respective devices D1, D2 and D3. In one implementation, a single (i.e., one and only one trigger signal as indicated in FIG. 5 as an ignition signal) is provided that successively is passed to each disconnect device D1, D2 and D3, resulting an inherent (but small) delay in the firing of the pyrotechnic energy store in each device 100 such that the devices D1, D2 and D3 operate successively one after the other.

The system 300 is easily modified to include additional devices 100 totaling the selected number n with similar operation to increase the breaking capacity of the system to a voltage potential equal to the product of the safe voltage potential of each device 100 (e.g., 150 VDC) and the number n. For example, if n is selected to be 6, the voltage potential capacity of the system would be 150 VDC times 6 or 900 VDC. As another example, if n is selected to be 7, the voltage potential capacity of the system would be 150 VDC times 7 or 1050 VDC.

It is understood in the above examples, however, that the safe voltage potential of 150 VDC is exemplary only, and as such, if similar devices 100 with different safe voltage potential were utilized instead other possibilities would result. For instance, if devices 100 were provided with safe voltage potential of 100 VDC instead of 150 VDC, when n is selected to be 6 the voltage potential of the system would be 600 VDC (100×6) and if n were selected to be 7 the voltage potential of the system would be 700 VDC (100×7). Therefore, varying the safe potential voltage of the devices 100 (up or down) from the aforementioned 150 VDC realizes a different set of voltage potentials of a number n of devices 100.

Figure 6:
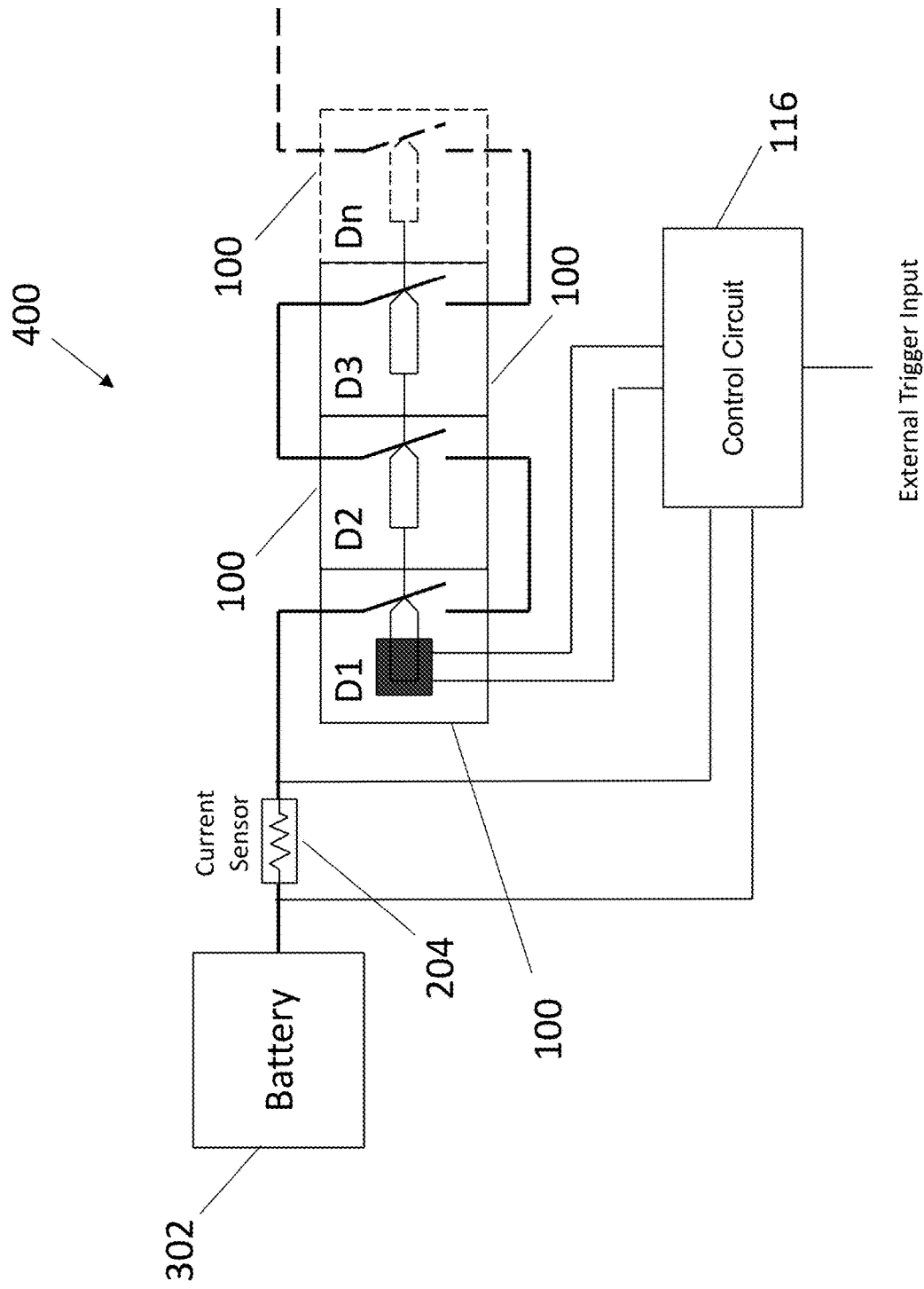
FIG. 6 is a third exemplary circuit schematic of low voltage active circuit protector devices shown in FIGS. 1 and 2 for higher voltage operation.
Figure 7:
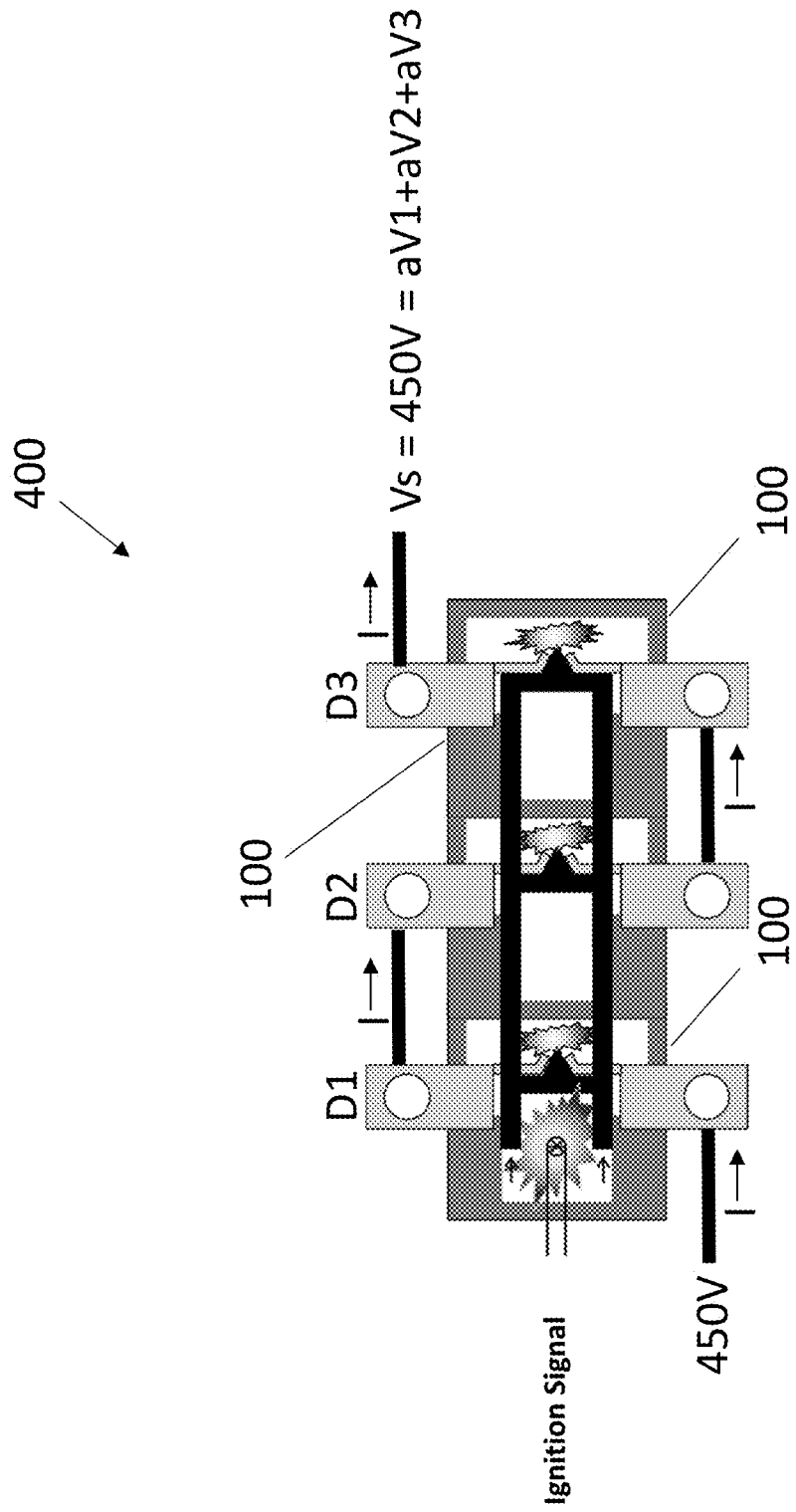
FIG. 7 illustrates an actuation of the low voltage active circuit protector devices shown in FIG. 6.

FIG. 6 schematically illustrates a system 400 including a plurality of devices 100 connected in series to one another, and without any other circuit protector (e.g. the fuses 202a, 202b in the system 200 of FIG. 3) to be coordinated with the devices 100. FIG. 7 is an assembly view of the system 400. Like the system 300 described above, the voltage potential capacity of the system 400 is the product of the safe voltage capacity of each device 100 (e.g., 150 VDC) and the number n of devices 100 provided. In FIG. 7, n is selected to 3 so the system 400 has a voltage capacity potential of 450 VDC. As in the system 300, the voltage capacity of the system 400 is scalable by adding additional devices 100.

In the system 400, the devices 100 (indicated as D1, D2, D3, Dn) are arranged in a stacked location with one atop another rather than side-by-side as shown in the assembly of FIG. 5. The line and load-side terminals 104, 106 and the weakened circuit conductors 108 of each device 100 extend in spaced apart but generally parallel planes to one another as shown in FIG. 7 with the terminals 104, 106 connected in a series arrangement to define a current path indicated as I through and between the devices 100 in FIG. 7. This arrangement allows the cutting elements 110 in each device to be aligned along a common axis, and when they are mechanically coupled or physically ganged together as shown, the cutting elements in each device D1 through Dn can be simultaneously propelled with a single igniter 114 and a single trigger signal (indicated in FIG. 7 as an ignition signal). The type of delay in the operation of the devices D1 through Dn that can occur in the system 300 is therefore avoided because the ganged cutting elements 110 in each device necessarily sever their respective weakened circuit conductors 108 at exactly the same time.

Comparing the systems 300 and 400, the system 400 eliminates energy stores and igniters for two of the three devices 100 provided in the example shown in FIG. 7, and therefore realizes some cost savings in relation to the system 300 shown in FIG. 5 that requires an energy store and an igniter in each of the three devices D1, D2 and D3. Such cost savings are partly offset by the needed physical ganging of the cutting elements 110 in the system 400.

The assembly of the system 400 is also more compact in size than the assembly of the system 300 and may therefore be more desirable for use in an EV power system, but is a bit more difficult from an assembly perspective as different types of devices 100 are required (with and without igniters) and modifications to adjoining housing pieces are beneficial as shown for the connected devices 100.

The benefits and advantages of the inventive concepts disclosed are now believed to have been amply illustrated in relation to the exemplary embodiments disclosed.

An embodiment of a high voltage, direct current circuit protection system has been disclosed including a number n of weakened circuit conductors connected in series to one another. Each of the number n of weakened circuit conductors is formed and fabricated in a manner to avoid metal fatigue in response to cyclic current loads. The system also includes a corresponding number n of cutting elements operable to sever the respective number n of weakened circuit conductors, at least one energy storage element acting upon one of the number n of cutting elements, a control element causing a release of stored energy in the at least one energy storage element and causing a displacement of at least one of the cutting elements to sever the respective weakened circuit conductor, and a corresponding number n of arc chambers arranged proximate each respective one of the number n of weakened circuit conductors, wherein n is an integer greater than 1 and wherein no circuit protector coordination with the weakened circuit protectors is required.

Optionally, the number n of weakened circuit conductors are arranged on a common centerline. Alternatively, the number n of weakened circuit conductors are arranged in spaced apart but parallel planes to one another.

As further options, each of the weakened circuit conductors and arc chambers may be safely operable with a voltage potential of 150 VDC or less. The system may further include a battery connected in series with the weakened circuit conductors, and the battery may operate with a voltage potential of 450 VDC or greater. The number n may be at least three.

Also optionally, the at least one energy storage element may be a pyrotechnic energy storage element. The may include at least one igniter for activating the pyrotechnic energy storage element. The at least one pyrotechnic energy storage element may include a corresponding number n of pyrotechnic energy storage elements each located proximate one of the number n of cutting elements, and the at least one igniter may include a corresponding number n of igniters, each of the number n of igniters respectively located proximate one of the number n of pyrotechnic energy storage elements.

The at least one energy storage element optionally may include a corresponding number n of energy storage elements, each of the number n of energy storage elements being proximate one of the cutting elements. The control element may be a single control element operable to cause all of the number n of energy storage elements to release stored energy. The single control element may cause a simultaneous release of stored energy from the number n of energy storage elements, or the number n of energy storage elements release stored energy with a respective time delay.

Each of the number n of cutting elements may be arranged along a common axis. The number n of cutting elements may be physically ganged together. The at least one energy storage element may be a single energy storage element causing displacement of the physically ganged cutting elements.

The system may further include line and load-side terminals, with the number n of weakened circuit conductors extending between the line and load-side terminal blades. The line and load-side terminals may be terminal blades. The system may not include a passive circuit protection fuse. The system may be provided in combination with an electric vehicle power system operating with a voltage potential of 450 VDC or higher.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A high voltage, direct current circuit protection system comprising:
   a number n of active circuit protection devices connected in series, each active circuit protection device comprising:
      a weakened circuit conductor;
      a cutting element operable to sever the weakened circuit conductor;
      an energy storage element acting upon the cutting element; and
      an arc chamber arranged proximate to the weakened circuit conductor; and
   a control element configured to cause a release of stored energy in the energy storage elements and displacement of the cutting elements to sever the respective weakened circuit conductors, wherein the control element is a single control element configured to control operations of all of the number n of active circuit protection devices responsive to an overcurrent condition detected by a current sensor, and wherein a control signal from the control element is configured to be successively passed through each of the number n of active circuit protection devices;
   wherein n is an integer greater than 1, and wherein a voltage potential capacity of the system is configurable by increasing the number n of active circuit protection devices.

2. The system of claim 1, wherein the weakened circuit conductors are arranged on a common centerline.

3. The system of claim 1, wherein each of the weakened circuit conductors and arc chambers are operable with a voltage potential of 150 VDC or less.

4. The system of claim 1, further comprising a battery connected in series with the weakened circuit conductors, the battery operating with a voltage potential of 450 VDC or greater.

5. The system of claim 1, wherein the number n is at least three.

6. The system of claim 1, wherein at least one of the energy storage elements is a pyrotechnic energy storage element, and the system further comprises at least one igniter for activating the pyrotechnic energy storage elements.

7. The system of claim 1, wherein, for each of the number n of active circuit protection devices, the energy storage element is a pyrotechnic energy storage element that is located proximate to the cutting element and the active circuit protection device further comprises an igniter that is located proximate to the pyrotechnic energy storage element.

8. The system of claim 1, wherein each of the energy storage elements is located proximate to the respective cutting element.

9. The system of claim 1, wherein the energy storage elements release stored energy with a respective time delay.

10. The system of claim 1, wherein each of the number n of active circuit protection devices further comprises line and load-side terminals, the weakened circuit conductor extending between the line and load-side terminals.

11. The system of claim 10, wherein the line and load-side terminals comprise terminal blades.

12. The system of claim 1, wherein the system does not include a passive circuit protection fuse.

13. The system of claim 1, in combination with an electric vehicle power system operating with a voltage potential of 450 VDC or higher.

14. The system of claim 1, wherein the voltage potential capacity of the system corresponds to a product of the number n of the active circuit protection devices and a voltage potential capacity of each active circuit protection device.

15. The system of claim 1, wherein the current sensor is configured to measure a current of a main power bus or a battery.

* * * * *